June 9, 1936.  L. L. CURCURU  2,043,794
MOTOR VEHICLE CLUTCH
Filed May 19, 1933  4 Sheets-Sheet 1
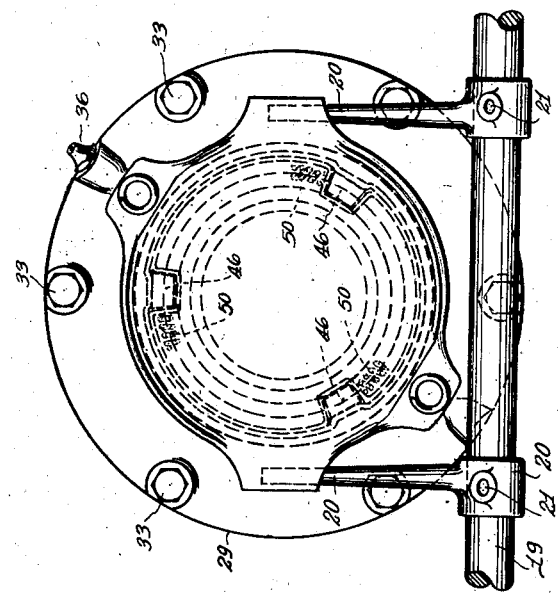
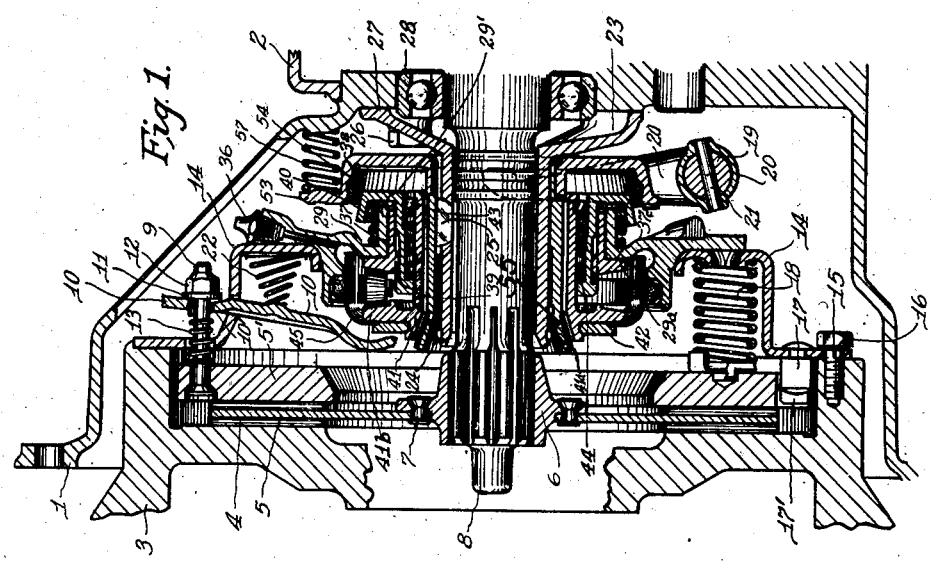
INVENTOR
Liborio L. Curcuru
BY
ATTORNEYS June 9, 1936.  L. L. CURCURU  2,043,794
MOTOR VEHICLE CLUTCH
Filed May 19, 1933   4 Sheets-Sheet 2
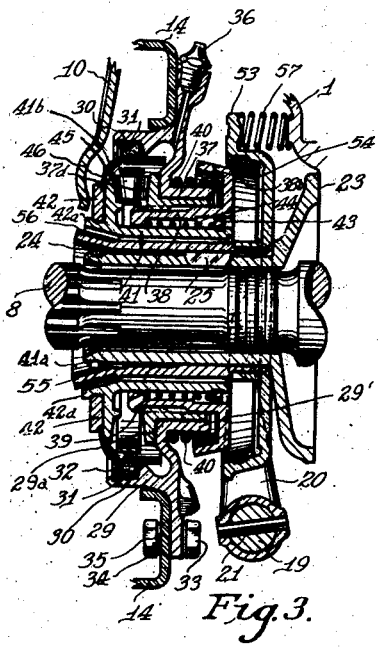
Fig. 3.
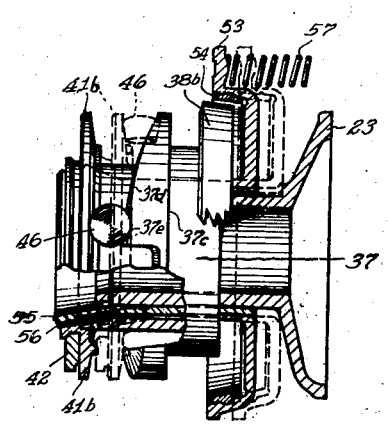
Fig. 5.
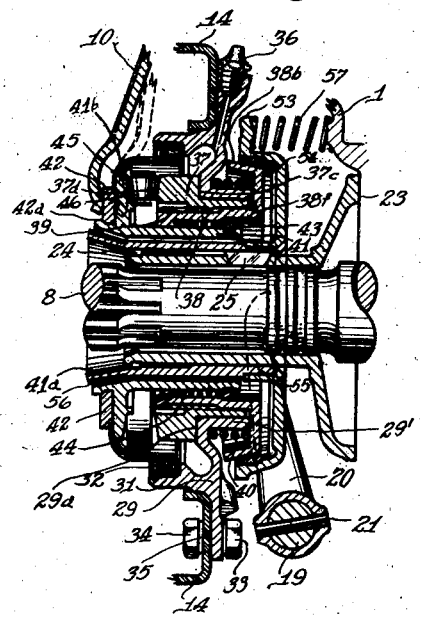
Fig. 4.
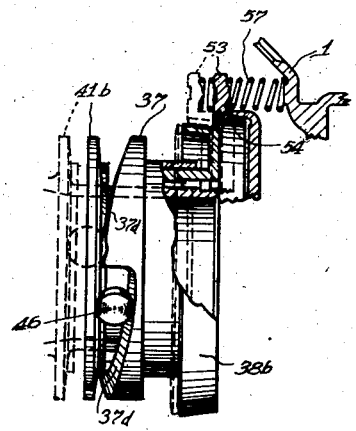
Fig. 6.
INVENTOR
Liborio L. Curcuru
BY 
ATTORNEYS June 9, 1936.   L. L. CURCURU   2,043,794
MOTOR VEHICLE CLUTCH
Filed May 19, 1933   4 Sheets-Sheet 3

INVENTOR
Liborio L. Curcuru.
BY
ATTORNEYS

June 9, 1936.  L. L. CURCURU  2,043,794
MOTOR VEHICLE CLUTCH
Filed May 19, 1933  4 Sheets-Sheet 4
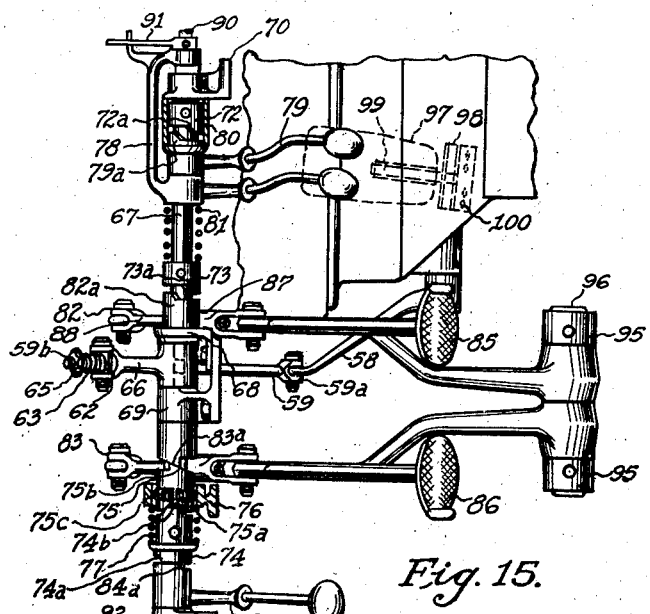
Fig. 15.
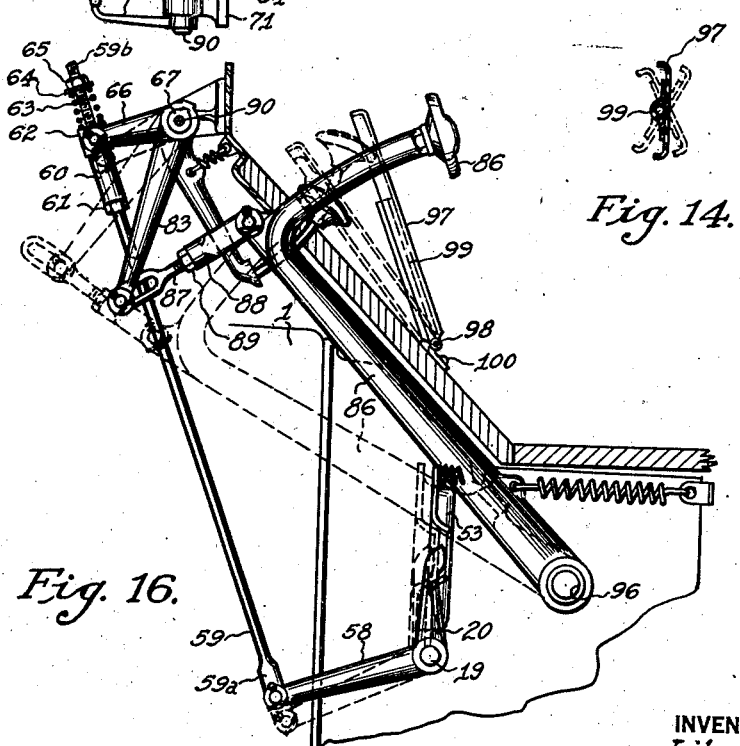
Fig. 14.
Fig. 16.
INVENTOR
Liborio L. Curcuru
BY
ATTORNEY Patented June 9, 1936

2,043,794

UNITED STATES PATENT OFFICE 2,043,794

MOTOR VEHICLE CLUTCH

Liborio L. Curcuru, Ferndale, Mich., assignor of one-third to Otto F. Barthel, Detroit, Mich.

Application May 19, 1933, Serial No. 671,869

6 Claims. (Cl. 192—36)

The present invention relates to a mechanical device for engaging and disengaging master clutches such as are used on automobiles and like vehicle.

The primary object of the present invention is to provide a clutch actuating device including constituent members having engageable friction surfaces, one of said members being connected to rotate with the flywheel and the other member being non-rotatable but slidable so that it may be moved into engagement with the first member to brake or retard the rotation thereof. The member which rotates with the flywheel embodies instrumentalities which function to disengage the master clutch when the braking or retarding action of the second member takes place.

A further object of the invention is to provide a manual control for an automobile clutch actuating device so that the latter can be operated by movement of an accelerator pedal, the purpose being to cause the master clutch to be automatically engaged by movement of the pedal tending to accelerate or open the throttle of the automobile engine and to cause the master clutch to automatically disengage as a result of movement of the pedal tending to decelerate or close the throttle of the engine, thereby resulting in free wheeling, and also permitting gear shifting without the usual application of the usual clutch disengaging pedal.

A further object of the invention is to provide means connecting the said manual control of the clutch actuator to the usual automobile brake pedal, the purpose being to automatically cause the master clutch to become engaged when the automobile brakes are applied, thereby automatically eliminating the free wheeling action and causing transfer of some of the braking load to the automobile engine.

A further object of the invention is to provide a separate control pedal for the actuating device which will cause the master clutch to be engaged independently of the accelerator and brake pedals.

With the foregoing and other objects in view which will more fully hereinafter appear, the invention resides in the combination and arrangement of parts and in the details of construction hereinafter described and claimed, it being understood that changes may be made in the precise embodiment of the invention herein disclosed without departing from the principle or spirit of the invention.

In the drawings,

Figure 1 is a longitudinal vertical cross section of the present actuator applied to a master clutch;

Fig. 2 is an end elevation illustrating the control yoke;

Fig. 3 is a longitudinal vertical cross section of the actuating device in neutral position wherein the master clutch is caused to be engaged;

Fig. 4 is a longitudinal vertical cross section of the actuating device in master clutch disengaging position;

Fig. 5 is a side elevation of the actuator unit, partly in cross section, and illustrating a position causing master clutch disengagement;

Fig. 6 is a view similar to Fig. 5 and illustrating another stage of operation;

Fig. 14 is a cross section of a throttle pedal;

Fig. 15 is a plan view of pedal control mechanism; and

Fig. 16 is a vertical section of the pedal control mechanism.

Like characters of reference are used throughout to designate corresponding parts.

Figure 7:
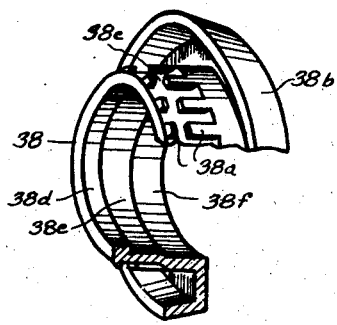
Fig. 7 is a fragmentary perspective detail of the cam actuating sleeve.

Referring to Fig. 1 the numeral 1 indicates a clutch housing of an automotive vehicle power plant of a type to which the present device is particularly adapted, it being understood that the present device can be adapted to any conventional automotive vehicle power plant by slight variations conforming to their different designs and characteristics. The numeral 2 indicates a fragment of a conventional transmission housing in which the usual change of speed mechanism commonly provided in automotive vehicles is enclosed.

A flywheel 3 has a friction disk 4 secured thereto to be engaged by a driven disc 5 which is secured to a hub 6 by rivets 7, the hub 6 being splined to a shaft 8 which is rotatably journalled in bearings 26 in the housing 1. A clutch pressure plate 5' is supported adjacent to the driven disc 5 by studs 9 which project through openings in a clutch cover plate 14, the latter being secured to the flywheel 3 by bolts 15 that have lock washers 16 under the heads thereof. The pressure plate 5' is held against rotation relative to the cover plate 14 by dowels 17 which are mounted in the cover plate to project into recesses 17' in the pressure plate. A plurality of main springs 18 are compressed between the pressure plate 5' and the cover plate 14 and normally urge the pressure plate towards the driven disc 5.

A plurality of clutch fingers 10 project through suitably disposed slots in the cover plate 14 and are provided with apertures 10' through which the studs 9 project. Washers 11 are placed on the studs 9 and are forced against the fingers 10 by nuts 12 which are screwed onto the ends of the studs 9 in a manner to compress coiled springs 13, which are sleeved on the studs 9, between the pressure plate 5' and the fingers 10. Springs 22 are interposed between the cover plate 14 and the part of the fingers 10 which extend inside said cover plate 14 in a manner to normally hold the fingers in their neutral position.

A shaft 19 is rotatably journalled to extend transversely in the clutch casing 1 and has arms 20 secured thereto by pins 21, the arms 20 extending upwardly in a manner to provide a fork to engage clutch actuating members to be presently described.

A clutch actuator supporting sleeve 23 is secured to the clutch housing 1 by bolts 26 and is disposed concentric with the shaft 8 which extends through the same and into the transmission housing 2. The sleeve 23 has a stop ring 24 mounted in a circumferential groove adjacent to its outer end and a key 25 mounted in a lengthwise extending groove as shown.

A thrust plate 29 is secured to the cover plate 14 by bolts 33, nuts 34 and lock washers 35. A lubricant retainer assembly 30 and 31 is secured to the thrust plate 29 by a lock ring 32. The thrust plate 29 is shown secured to the cover plate 14 but it may, if desired, be formed as an integral part of the cover plate 14, thus eliminating bolts 33, nuts 34, lock washers 35 and the finished surfaces which are necessary to secure the parts together. A lubricator fitting 36 of the check valve type is mounted in the thrust plate 29. The thrust plate 29, because it is secured to the cover plate 14, revolves with the flywheel 3, and it is formed with an annular part 29' formed in the center thereof and providing a smooth, cylindrical bore. In the bore in the annular part 29' is inserted a sleeve 37 having a smooth outside surface and an inner surface formed with splines 37a extending a part of the length at the front end thereof and having a smooth inner bore at the other end. The sleeve 37 is formed with an outwardly directed flange 37b at the front end thereof, the flange having a smooth friction face 37c at its rear side and a cam surface 37d at its front side as clearly shown in Fig. 8. In the sleeve 37 is loosely inserted a sleeve 38 having splines 38a formed on its outer surface adjacent to one end and received in the splines 37a in the sleeve 37. The sleeve 38 has an end flange with a conical friction face 38b. A circumferential groove 38c is formed at the front end of the splines 38a and after the sleeve 38 is inserted in the sleeve 37 a split lock ring 39 is snapped into the groove 38c. The lock ring 39 thus serves to retain the sleeve 38 within the sleeve 37 inasmuch as lengthwise movement of the splines 37a tending to remove the sleeve 38 is blocked by the ring which extends around the sleeve 38 and thus across the grooves between the splines 38a. As indicated in Fig. 7, the sleeve 38 has three inner diameters 38d, 38e and 38f of different diameters.

Sleeves 37, 38 and lock ring 39 are so assembled as to allow the sleeve 38 to move longitudinally a predetermined distance before butting against the rear end of the annular part 29' on the thrust plate 29. An extending spring 40 urges the sleeve 38 to the rear, causing the lock ring 39 to engage the front ends of the splines 37a to move the sleeve 37 into frictional engagement with a friction surface 29a on the thrust plate 29, under sufficient pressure to cause the sleeve 37 to rotate with the thrust plate and thus with the flywheel 3, the driving connection thus provided being non-positive. Inside the front diameter 38d of the sleeve 38 is inserted a sleeve 41 having a smooth outer surface and an outwardly directed flange 42a at its front end holding a thrust washer 42. Slightly spaced from the rear end of the sleeve 41 is a circumferential groove containing thrust ring 43. The sleeve 41 has a smooth inner bore which is countersunk to provide a conical friction surface 41a at its front end. In the inner diameter 38e, and surrounding the sleeve 41 to engage the ring 43, is an extending spring 44 urging the sleeve 41 to the rear. The sleeve 41 is provided with an outwardly directed flange 41b.

Between the sleeve 41 and thrust washer 42 is held a drum 45. Between the cams 37d of the sleeve 37 and flange 41b of the sleeve 41 are disposed rollers 46. The rollers are held in place by roller pins 47 that are secured in outer and inner cage members 48 and 49 respectively, which are held in concentric spaced relation by spacers 52, and springs 50 are held between the cage members by retainers 51.

Figure 11:
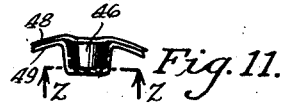
Fig. 11 is a partial elevation of a modified form of retainer for thrust roller bearing.
Figure 12:
Fig. 12 is a section on line Z—Z of Fig. 11.
Figure 13:
Fig. 13 is a partial elevation of another modification of thrust roller bearing.

In the modified form of cage illustrated in Figs. 11 and 12 the two cage members are arranged so that the inner member 49 fits snugly in the outer member 48. The inner member 49, however, is bent away from the outer member at certain points so as to provide a space between the two cage members to accommodate the rollers 46. Pins 47 may be employed as illustrated in Fig. 13 to secure the rollers illustrated in Figs. 11 and 12 in place.

A dished retarding plate 53 has an annular friction member 54 secured therein, the retarding plate being rigidly secured to a sleeve 55 which extends through the sleeve 41. The sleeve 55 is formed at its front end with a conical enlargement having a friction band 56 secured thereto and a spring 57 exerts pressure tending to hold the friction band 54 against the friction surface 38b of the sleeve 38.

In Fig. 16 a clutch operating lever 58 is illustrated as secured on the end of the shaft 19 which extends through the side wall of the clutch housing 1, and a link 59 is provided with a yoke 59a on one end and threads 59b on the other, the yoke 59a being pivotally connected to the outer end of the lever 58. The other end of the link is slidably and adjustably secured to a trunnion 62 by a nut 60 and lock nut 61 which engage one side of the trunnion through which the link extends, the other side of the trunnion being engaged by a spring 63 which is sleeved on the end of the link 59 and backed by a washer 64 and nut 65.

66 is a lever supporting the trunnion 62 at its outer end, the lever 66 being keyed or splined to a master shaft 67 and held against endwise movement by stationary supporting brackets 68 and 69. Fixed supporting brackets 70 and 71 are provided with smooth inside bores to support the shaft 67. A sleeve 72 having cam faces 72a at one end and a straight square face at its other end is secured to and rotatable with the shaft 67. 73 is a sleeve secured to the shaft 67 and having a cam end 73a. 74 is a sleeve secured to the shaft 67 and formed with a cam 74a at one end and a projection 74b at its other end. A sleeve 75 is formed with a notch 75a at one end and adapted to receive the projection 74b, and with cam surfaces 75b at its other end. The sleeve 75 has outer splines or keys 75c slidable in the splines or keyways in a fixed bracket 76 whose axis is concentric with the axis of said shaft 67. Lever 66, and sleeves 72, 73 and 74 are secured to the shaft 67 in definitely spaced relation, and the sleeve 75 is loose relative to the shaft 67. An extending spring 77 exerts pressure tending to separate said sleeves 74 and 75.

78 is a throttle lever pivoted at one end on the master shaft 67 and at its other end on a rotatable throttle shaft 90 which extends through an axial bore in the shaft 67.

A clutch applying pedal 79 is mounted on the shaft 67 and has a cam 79a in its hub to fit the cam 72a on the sleeve 72, the pedal being freely rotatable on the shaft 67. A sleeve spacer 80 holds the pedal 79 spaced from the bracket 70. 82 and 83 are levers with hubs freely rotatable on the shaft 67 and cams 82a and 83a on their respective hubs. A clutch applying pedal 84 has a hub freely rotatable on the shaft 67 and a cam 84a on the end of said hub. 85 is the usual brake operating pedal and 86 a clutch operating pedal and slotted linking rods 87 having adjusting yokes 88 and lock nuts 89 connect the levers 82 and 83 to the brake and clutch pedals respectively.

91 and 92 are throttle levers secured on the outer ends of the shaft 90. Brake and clutch pedal brackets 95 are provided to support the clutch and brake pedal shaft 96 on which the pedals 85 and 86 are mounted.

97 is an optional pedal swinging on the toe board and rockable as shown in Fig. 14 on the hinge 98 on which the pedal 97 is pivoted on a T pivoting shaft 99.

Having now indicated the several parts of my invention by reference characters the construction and operation of the same will be readily understood.

The parts in Fig. 15 have been shown in a position causing clutch engagement, it being assumed that pedal 84 has been depressed, and that it is being held in a depressed position. The first function during depression of the pedal 84 was engagement of cam 84a with cam 74a, and this engagement caused rotation of sleeve 74 until the projection 74b became aligned with the notch 75a. The projection 74b entered the notch 75a and in so doing the lengthwise movement of sleeve 74, necessary for such a function, imparted lengthwise movement to the shaft 67, and the movement of shaft 67 carried sleeves 72 and 73 lengthwise and moved them out of cooperative relationship with the cams 79a and 82a respectively. It thus becomes apparent that pedal 84 acts as a master control for moving the shaft 67 to move lever 66, rod 59 and lever 58 to rotate shaft 19. Rotation of shaft 19 causes movement of arms 20 and retarding plate 53 with its component parts 55 and 56 engaging the sleeve 41, as in Fig. 5, and causing it to be gradually retarded, thus rotating rollers 46 and causing them to descend on the cams 37d whereby sleeve 41 moves away from the fingers 10 and springs 18 may engage the master clutch.

As is described in a later stage of the description, means is provided in association with the throttle and brake pedals for actuating the master clutch. The pedal 84 and its connected parts, functioning as above described, constitutes means independent of the means associated with the throttle and brake pedals for actuating the master clutch. When the manual pressure is removed from the pedal 84 the spring 57 functions to move the retarding plate 53 forward, and through the above described train of connections (20, 19, 58, 59, 63 and 66) rocks shaft 67 back to the starting position and effects release of the master clutch.

After setting the automobile engine in motion to rotate the flywheel 3 with the clutch released the operator may shift gears into first speed position and proceed by applying the accelerator pedal 78 and pedal 79 gradually and in synchronism with the throttle lever 78, allowing the clutch to engage properly as follows; in this specific or particular construction as will be observed from Figs. 1, 2, 3 and 4 the parts of the automatic device, with the exception of the retarding plate 53, revolve with the flywheel. By applying the pedal 79 the sleeve cam 72a is engaged by the cam 79a and the pressure of the spring 81 is sufficient to cause a clutching action between the two cams to revolve the shaft 67 and lever 66. The rod 59 is pulled upwardly by movement of the shaft 67 and the lever 58 causes the shaft 19 to rotate. Rotation of the shaft 19 moves the arms 20 and moves the stationary retarding plate 53 to the rear with its component parts 55 and 56 thus engaging the sleeve 41 as in Fig. 5 and causing it to be gradually retarded, thus rotating the rollers 46, allowing them to descend on cams 37d causing the sleeve 41 to move away from the fingers 18 so that the pressure of the springs 18 may engage the master clutch.

When the projection 74b is in the notch 75a it tends to retard rotation of the shaft 67 and causes the pedal 79 to continue its travel without further rotating the shaft. The spring 63 compensates for any commercial imperfections which might cause too great a movement of the link 59. Attention will now be called to several features resulting just previous to full engagement.

*First.*—In Fig. 3 the slidable sleeve 55, friction ring 56 and retarding plate 53 are forced against the shoulder of the sleeve 23 while the sleeve 41 continues the travel for a short distance, thus separating it from the sleeve 55 and friction band 56 and allowing it to resume its rotation with the rest of the device and the flywheel.

*Second.*—The drum 45 travels with the sleeve 41 and thus slides in the packing or lubricant retaining assembly 30 in the annular part of the plate 29 and prevents a quick return of the sleeve 41 due to the fact that any air or oil inclosed within the annular part of the plate 29 will be trapped between the drum 45, lubricant retainer assembly 30, 31, plate 29, sleeve 37, sleeve 38 and sleeve 41, and the rate of escape of this air or oil from between these slidably related parts will determine the rate of movement of the sleeve 41.

Figure 10:
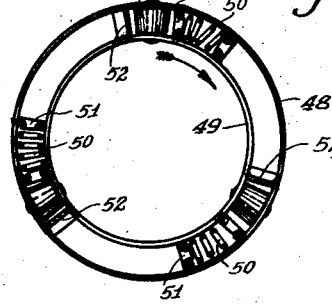
Fig. 10 is an elevation of the thrust roller bearing assembly.

*Third.*—At completion of said engagement each roller 46 has reached the low point of its cam 37d and has still a certain rotating momentum opposite to that of the sleeve 37 and in order to avoid clashing a cushioning spring 50 is inserted between each roller and shoulder of the adjacent cam. As shown in Fig. 10 the rollers are mounted in a cage formed of two cage rings 48 and 49. The spring 50 has one end secured to the cages 48 and 9 and when assembled the other end of this spring 50 engages the end of a cam 37d. The impact of the roller unit, through the action of the sleeve 1, against the shoulder of the cam 37d will carry said cam 37d with it until overcome by the friction of the plate 29 at which point it will resume its rotation with the flywheel.

In releasing: Pedal 97 is released, allowing the accelerator pedal 78 to rise and the springs 77 and 81 to move the shaft 67 to its original or neutral position wherein the projection 74b is withdrawn from the notch 75a, and the shaft 19, arms 20, lever 58, link 59, lever 66 and shaft 67 are free to move. Thereupon the spring 57 advances the retarding plate 53 to engage the clutch face 38b of sleeve 38. The sleeve 38 is thus retarded, and retards with it the sleeve 37, through splines 37a and 38a, and rotates the cam 37d opposite from the sleeve 41 and flywheel 3, causing the rollers to climb to the high points of the cams 37d, thereby repelling the sleeve 41 and through the washer 42 pushing the fingers 10 and releasing the master clutch.

Attention will now be called to the means for automatic releasing of the sleeve 38 from the retarding plate 53 as follows:

In Fig. 4, the sleeve 55 has been moved from the position shown in Fig. 3 until the bottom of its conical enlargement comes into engagement with the ring 24 which engagement prevents further movement of the sleeve in a left hand direction as the drawing is viewed. At this time the ring 43 at the rear end of the sleeve 41 has come into engagement with a shoulder in the inner rear bore of the sleeve 38. This action takes place a short distance before the full lengthwise travel of the sleeve 41, at which point the sleeve 38 is engaged and forced away from the friction member 54, through the action of cam sleeve 37 and rollers 46. At this time the elements 10 will have been moved to disengage the clutch.

Figure 8:
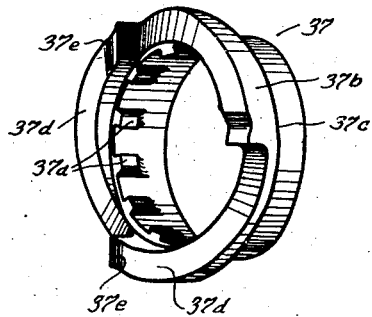
Fig. 8 is a perspective detail of a part of the actuator.
Figure 9:
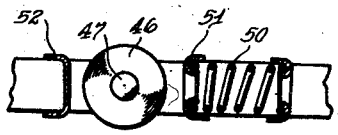
Fig. 9 is a partial sectional detail of a roller thrust bearing shock eliminating spring and retainer assembly.

The high points of the cams 37d on the sleeve 37 have a small depression 37e as shown in Fig. 8 immediately adjacent to the high peak of each cam and these depressions cause the rollers to stop in a somewhat wedged position due to the limited travel of the sleeve 41 caused by the ring 43, inner shoulder in the sleeve 38 and rear end of the annular part 29' of the plate 29. The shock thus caused on cam 37d is absorbed in this case by friction between the rear face 37c of the flange 37b on the sleeve 37 and the front face of the plate 29.

Another important feature in said releasing action rests in the fact of eliminating the use of thrust ball bearings, said action taking place within the clutch itself, namely, between the plate 29 and the clutch fingers 10.

Returning to the control mechanism of Figs. 15 and 16, there is a linkage composed of parts 87, 88 and 89 connecting the brake pedal 85 to the lever 82. On application of said brake pedal 85, lever 82 is rotated, engaging the cam sleeve 73, shaft 67, lever 66, rod 59, rotating lever 58, shaft 19, arms 20, and causing the stationary retarding plate 53 to engage the drive. When braking is near completion and before stalling the engine, the clutch may be released as follows:

A linkage composed of parts 87, 88 and 89 connects the clutch pedal 86 to the lever 83, causing said lever to partially rotate its hub cam 83a upon application of said clutch pedal so that the cams 75b and 83a permit the spring 77 to withdraw the projection 74b on the sleeve 74 from the notch 75a in the sleeve 75, allowing the shaft 67 to return to its neutral position and releasing the clutch in the manner above described.

Pedals and levers are so arranged with their respective cams that when one is applied the others remain in their neutral position.

Although a specific embodiment of the present invention has been illustrated and described it is to be understood that various changes may be made within the scope of the appended claims without departing from the spirit of the invention, and such changes are contemplated.

What I claim is:

1. In combination with a master clutch having resilient means normally causing engagement thereof, a part rotatable with the moving part in said clutch and supporting movable members for disengaging said clutch, a sleeve rotatably journalled in said part which rotates with said clutch and adapted to rotate with said part through friction therewith, a second sleeve adapted to engage said movable members so that movement in one direction causes said members to disengage said clutch and movement in the other direction permits said clutch to be engaged, cams formed on one of said sleeves, rollers mounted between said cams and said second sleeve so that relative rotary movement of said sleeves results in relative longitudinal movement, and a retarding member, said retarding member having a part adapted to frictionally engage said first named sleeve and a part adapted to frictionally engage said second named sleeve to selectively cause relative rotation in opposite directions.

2. An actuator for a clutch, said actuator including an annular cam member adapted to rotate with the moving part of a clutch through a frictional connection therewith, an annular body operatively connected to said clutch so that movement in one direction causes disengagement of said clutch and movement in the opposite direction permits engagement of said clutch, rollers mounted between said cam member and said annular member, said annular member being adapted to rotate with said cam member through a frictional connection therewith, and a retarding device adapted to selectively engage said cam member and said annular member.

3. An actuator for a clutch having resilient means normally causing engagement of the same, a sleeve adapted by longitudinal movement in one direction to disengage said clutch and by movement in the other direction to permit said clutch to engage, a part adapted to rotate with said clutch, a second sleeve rotatably journalled in said rotatable part and adapted to rotate with said part through friction therewith, said second sleeve having annular cam surfaces, rollers between said cam surfaces and said first named sleeve, a third sleeve rotatably mounted on said first sleeve and splined within said second sleeve to have a limited longitudinal movement relative thereto, resilient means interposed between said first and third named sleeves, and a retarding device adapted to selectively engage said first and third named sleeves.

4. The combination with a clutch actuator, a shaft operatively connected to said actuator, a plurality of pedals rotatably mounted on said shaft, said pedals having hubs formed with cams, cams secured to said shaft adjacent to said hubs, one of said pedals being adapted through the cams thereon to rotate said shaft to move said actuator in a clutch disengaging direction, a cam member, and another pedal having a cam adapted through engagement with said cam member to rotate said shaft to move said actuator in a clutch engaging direction.

5. An actuator for a clutch having resilient means normally causing engagement of the same, a sleeve adapted by longitudinal movement in one direction to disengage said clutch and by movement in the other direction to permit said clutch to engage, a part adapted to rotate with said clutch, a second sleeve rotatably journalled in said rotatable part and adapted to rotate with said part through friction therewith, said second sleeve having annular cam surfaces, rollers between said cam surfaces and said first named sleeve, a third sleeve rotatably mounted on said first sleeve and splined within said second sleeve to have a limited longitudinal movement relative thereto, resilient means interposed between said first and third named sleeves, a retarding device adapted to selectively engage said first and third named sleeves, a shaft operatively connected to said retarding device, a pedal on said shaft and adapted to move the same to cause movement of said retarding device in one direction, and another pedal on said shaft and adapted to move the same to cause movement of said retarding device in the opposite direction.

6. An actuator for a clutch having a rotatable part and resilient means for causing engagement of a driven part therewith, a plate carried by said rotatable part, an annular cam member rotatably journalled in said plate and normally rotating therewith through frictional engagement, an annular body operatively connected to said driven part so that longitudinal movement in one direction thereof causes said driven part to be disengaged from said rotatable part and movement in the opposite direction permits said resilient means to cause engagement of the driven part, said annular body being supported relative to said annular cam member whereby it may normally rotate therewith, rollers mounted between said cam member and said annular body so that relative rotation in opposite directions causes said annular body to be moved longitudinally in one direction and opposite relative rotation permits movement in the other direction, and a retarding device operable to selectively retard said cam member and said annular body.

LIBORIO L. CURCURU.